(12) United States Patent  
Ben-Akiva et al.

(10) Patent No.: US 10,024,978 B2  
(45) Date of Patent: Jul. 17, 2018

(54) TRAVEL SURVEY SYSTEMS AND METHODS

(71) Applicant: Massachusetts Institute of Technology, Cambridge, MA (US)

(72) Inventors: Moshe E. Ben-Akiva, Brookline, MA (US); Francisco C. Pereira, Arlington, MA (US); Pericles C. Zegras, Cambridge, MA (US); Fang Zhao, Singapore (SG)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/594,611

(22) Filed: Jan. 12, 2015

(65) Prior Publication Data

US 2015/0198722 A1 Jul. 16, 2015

Related U.S. Application Data

(60) Provisional application No. 61/925,697, filed on Jan. 10, 2014.

(51) Int. Cl.
| | | |
|---|---|---|
| *G01S 19/49* | (2010.01) | |
| *G01S 19/46* | (2010.01) | |
| *G01S 19/39* | (2010.01) | |
| *G01S 19/48* | (2010.01) | |
| *G01S 5/02* | (2010.01) | |

(Continued)

(52) U.S. Cl.
CPC ............ *G01S 19/49* (2013.01); *G01S 5/0263* (2013.01); *G01S 5/0294* (2013.01); *G01S 19/39* (2013.01); *G01S 19/46* (2013.01); *G01S 19/48* (2013.01); *G08G 1/012* (2013.01); *G08G 1/0112* (2013.01);

(Continued)

(58) Field of Classification Search
CPC ................................ G01S 19/49; G01S 19/46
See application file for complete search history.

(56) References Cited

U.S. PATENT DOCUMENTS

| 2005/0048977 A1 | 3/2005 | Dorenbosch et al. |
| 2009/0119001 A1 | 5/2009 | Moussaeiff et al. |

(Continued)

FOREIGN PATENT DOCUMENTS

| EP | 2608181 A1 | 6/2013 |
| WO | WO 2010/042545 A2 | 4/2010 |

OTHER PUBLICATIONS

PCT Search Report and Written Opinion of the ISA dated Apr. 29, 2015; for PCT Pat. App. No. PCT/US2015/010999; 12 pages.

(Continued)

*Primary Examiner* — Yonel Beaulieu  
*Assistant Examiner* — Martin A Weeks  
(74) *Attorney, Agent, or Firm* — Daly, Crowley, Mofford & Durkee, LLP

(57) ABSTRACT

Systems and methods for collecting travel data include a mobile application capable of being executed on a mobile computing device and configured to monitor and log travel data related to travel of the mobile computing device, and to communicate the travel data over a network. A networked data processing device may be coupled to receive the travel-related data from the network and analyze the travel-related data to identify a mode of travel of the mobile computing device. A graphical user interface allows a user of the mobile computing device to verify accuracy of the identified means of travel.

25 Claims, 17 Drawing Sheets

(51) Int. Cl.
*G08G 1/01* (2006.01)
*H04W 4/04* (2009.01)
*G01C 21/34* (2006.01)

(52) U.S. Cl.
CPC ............ *G08G 1/0133* (2013.01); *H04W 4/04* (2013.01); *G01C 21/3492* (2013.01)

(56) References Cited

U.S. PATENT DOCUMENTS

| | | | |
|---|---|---|---|
| 2010/0217529 A1* | 8/2010 | Stroila | G01S 17/89 |
| | | | 702/5 |
| 2010/0292921 A1 | 11/2010 | Zachariah et al. | |
| 2010/0332118 A1 | 12/2010 | Geelen et al. | |
| 2011/0112908 A1 | 5/2011 | Rowley et al. | |
| 2011/0148623 A1 | 6/2011 | Bishop et al. | |
| 2011/0184646 A1* | 7/2011 | Wong | G01S 5/0284 |
| | | | 701/300 |
| 2011/0313880 A1* | 12/2011 | Paul | G06Q 30/0631 |
| | | | 705/26.7 |
| 2012/0035924 A1* | 2/2012 | Jitkoff | G01C 21/3608 |
| | | | 704/235 |
| 2012/0130817 A1* | 5/2012 | Bousaleh | G06Q 30/0261 |
| | | | 705/14.58 |
| 2012/0284256 A1* | 11/2012 | Mahajan | G06F 17/3087 |
| | | | 707/722 |
| 2012/0330547 A1* | 12/2012 | Witte | G01C 21/3446 |
| | | | 701/533 |
| 2013/0275032 A1 | 1/2013 | Yorke et al. | |
| 2013/0080239 A1* | 3/2013 | Okerlund | G06Q 30/0226 |
| | | | 705/14.33 |
| 2013/0176869 A1 | 7/2013 | Finlow-Bates et al. | |

OTHER PUBLICATIONS

Intellectual Property Office of Singapore Written Opinion dated May 18, 2017 for SG Appl. No. 11201605474R; 7 pages.
Response to Written Opinion dated May 30, 2017 for Singapore Patent Application No. 11201605474R; Response Filed Oct. 27, 2017; 9 pages.
Extended European Search Report dated Aug. 18, 2017 for International Application No. 15735373.1-1812; 10 Pages.

\* cited by examiner

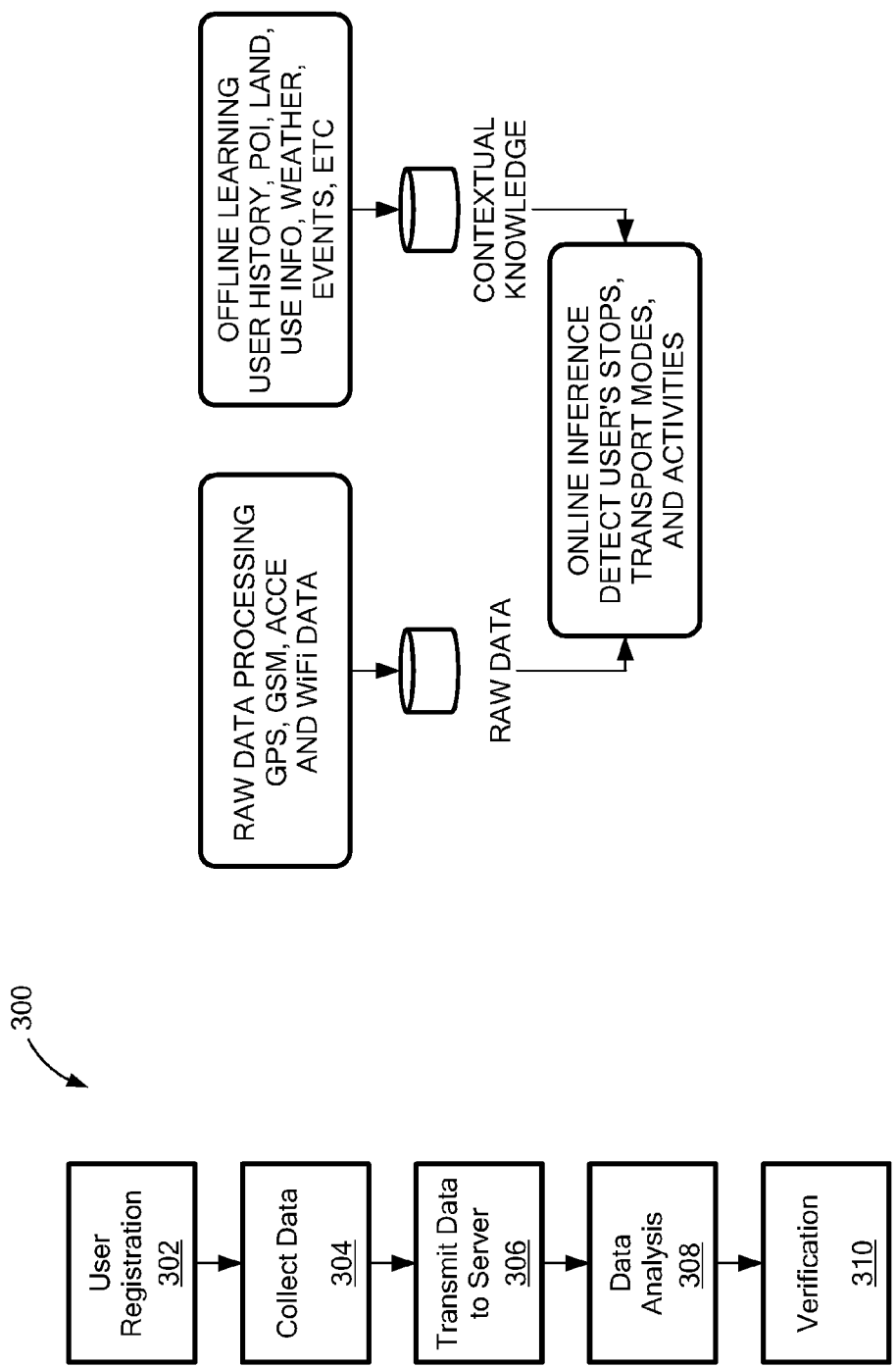

PRESURVEY
PART 1 / 4
DEMOGRAPHIC
Please tell us about yourself.
(5-10 minutes)

1) What is your age?

2) What is your gender?

3) What is your marital status?

4) Which of the following best describes your employment situation?

5) Which category best describes your highest level of formal education?

6) How do your describe your racial background?

7) Last year, what was your total household income from all sources before tax?
Currency  Quantity          ⊙ Prefer not to answer/Don't Know Next section ▶

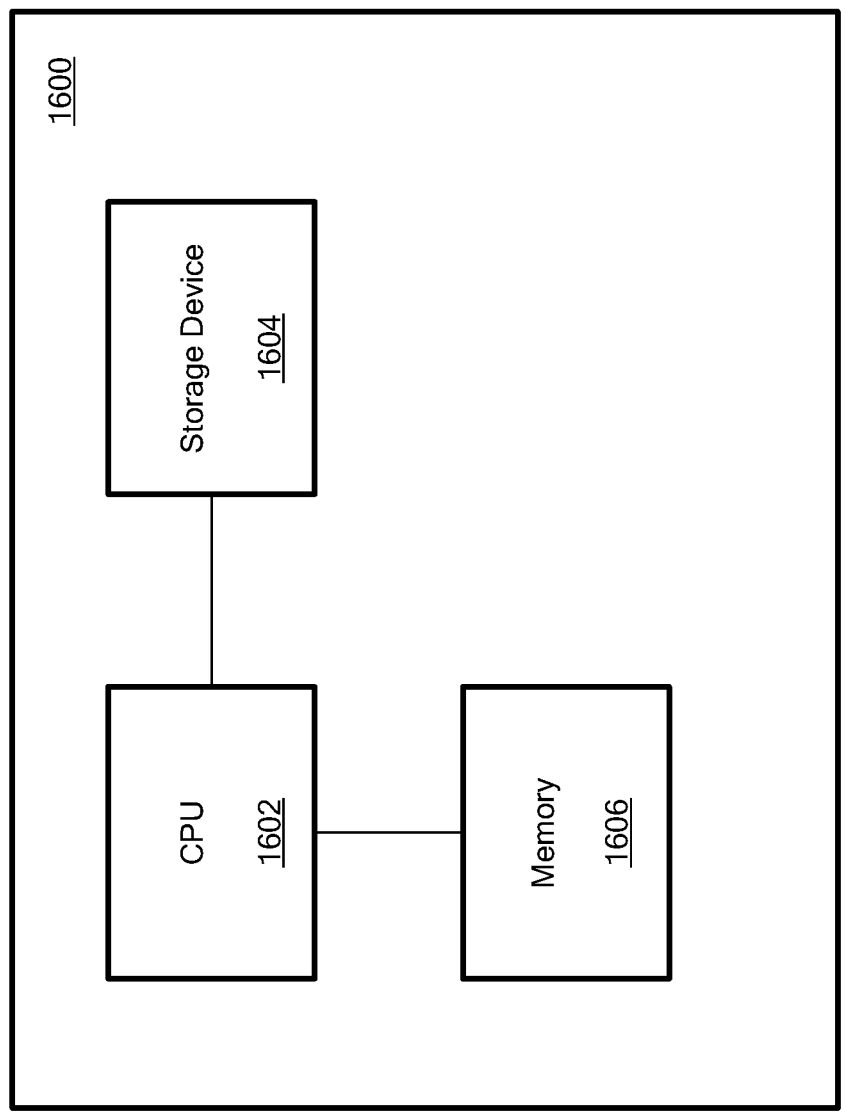

TRAVEL SURVEY SYSTEMS AND METHODS

CROSS-REFERENCE TO RELATED APPLICATIONS

This application claims the benefit under 35 U.S.C. § 119(e) of U.S. Provisional Application No. 61/925,697, filed Jan. 10, 2014, titled FUTURE MOBILITY SURVEY, which is incorporated herein by reference in its entirety.

STATEMENTS REGARDING FEDERALLY SPONSORED RESEARCH

Not Applicable

FIELD

The concepts, systems and techniques described herein relate to travel surveys and, more particularly, to systems and methods for collecting travel data from computer programs executing on one or more mobile devices (such computer program herein after referred to as "mobile applications" or more simply "mobile apps").

BACKGROUND

As it is known in the art, effective traffic planning for a geographic area requires an understanding of actual traffic conditions in the area. Information about traffic patterns and volumes, including types of traffic, speed, purpose of the trip, duration of the trip, trip frequency, etc. are used by traffic planners to design traffic systems. Such information is useful for municipalities engaged in town and city planning; traffic engineers designing roadways, subways, or other traffic systems; law enforcement agencies that wish to create targeted traffic enforcement policies; and many others.

Traffic survey data is typically collected via devices placed on or near a roadway. Such devices include but are not limited to weight activated bending plates embedded in the road, pneumatic road tubes, piezo-electric sensors, and the like. Traffic data is also collected by travelers filling out surveys about their travel and by human observation. The data from these various sources, when viewed together, can provide a picture of traffic patterns for a particular area. However, these methods of gathering traffic data are expensive to perform. Also, such methods provide a limited view of the traffic that can quickly become out of date because the methods provide only a snapshot in time of the traffic patterns and do not provide continuous data collection.

SUMMARY

In an embodiment, a system for collecting travel data includes a mobile application capable of being executed on a mobile computing device and configured to monitor and log travel data related to travel of the mobile computing device, and to communicate the travel data over a network. A networked data processing device may be coupled to receive the travel-related data from the network and analyze the travel-related data to identify a mode of travel of the mobile computing device. A graphical user interface allows a user of the mobile computing device to verify accuracy of the identified means of travel.

In another embodiment, a method of collecting travel data includes collecting data about location and travel of a user by a mobile device of the user. The data may be transmitted data to a central server, which may analyze the data to: identify one or more modes of travel undertaken by the user and/or identify one or more activities of the user. A web interface may be provided including features to verify the modes of travel and activities of the user. Whether information entered by the user via the web interface is consistent with the collected data may be identified.

BRIEF DESCRIPTION OF THE DRAWINGS

The foregoing features of this invention, as well as the invention itself, may be more fully understood from the following description of the drawings in which:

FIG. 3 is a flowchart of a process for collecting travel data.

FIG. 4 is a block diagram of a system for analyzing travel data.

FIG. 9 is a graphical user interface screen for registering a user.

FIG. 10, FIG. 11, and FIG. 12 are graphical user interface screens for verifying travel data.

FIG. 16 is a block diagram of a computing device.

Like figures in the drawings denote like elements.

DETAILED DESCRIPTION OF THE INVENTION

The systems and methods described here are related to the collection of travel data for a user. It will be recognized that the embodiments described here may be capable of compiling travel data taken from multiple users and sources, which can be used to create a profile of traffic patterns.

Figure 1:
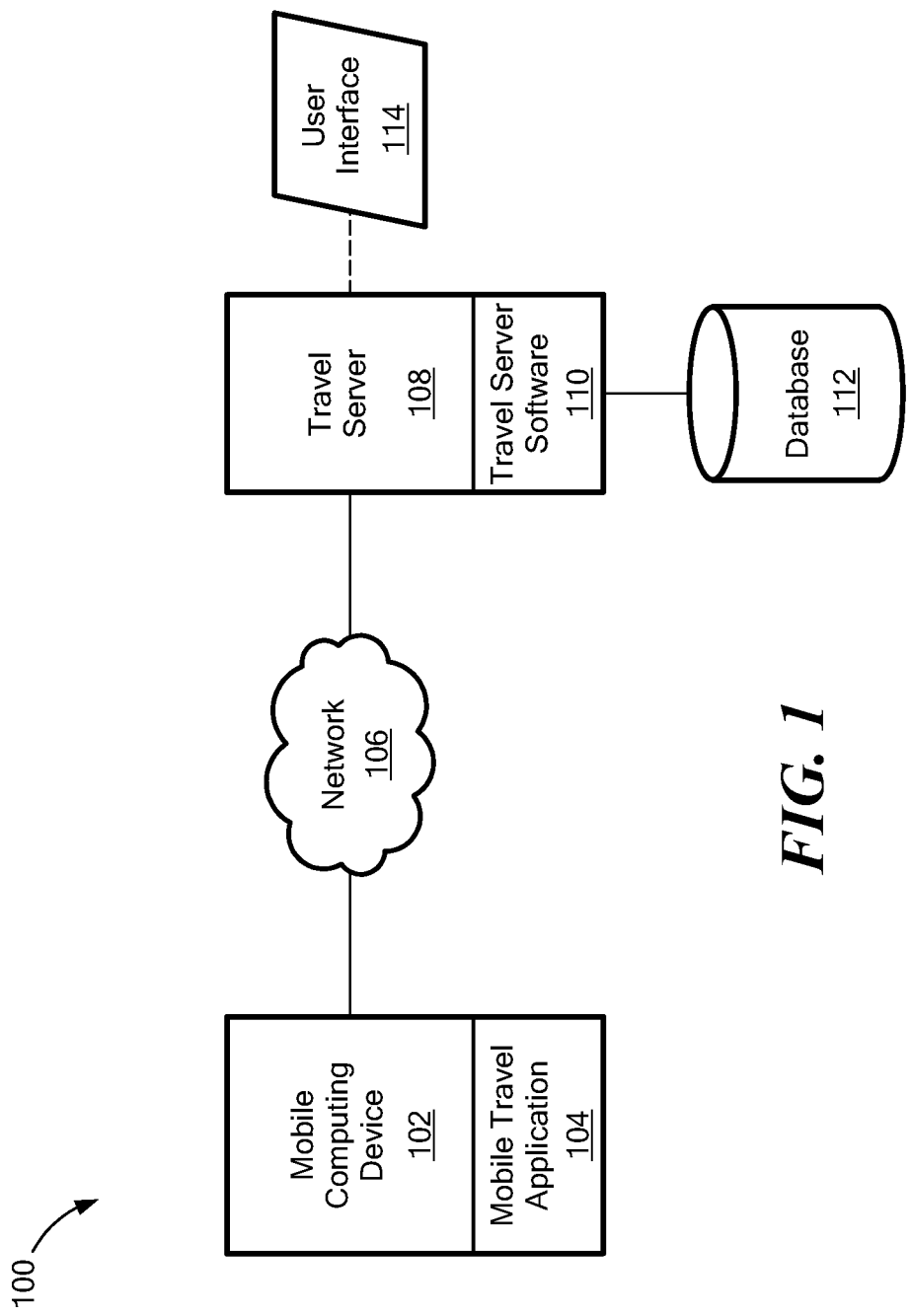
FIG. 1 is a block diagram of a system for collecting travel data.

Referring to FIG. 1, an illustrative traffic and travel survey system 100 includes at least one mobile computing device 102. Mobile computing device 102 may be a mobile phone, a tablet, a laptop, or any other type of computing device that a user can carry during travel. Mobile computing device 102 may be capable of executing computer codes (e.g. computer program(s) or application(s) or "apps," and may also have a network communication interface to communicate over network 106. The communication interface may be a Wi-Fi interface, a Global System for mobile communication (GSM) interface, a Bluetooth interface, or any other type of known or as yet unknown networking interface in the art that allows mobile computing device 102 to communicate over a network.

Mobile computing device 102 may execute travel application 104, configured to collect information about the physical movements of a user carrying or otherwise supporting the mobile computing device 102. Mobile travel application 104 may comprise software instructions which, when executed by mobile computing device 102 may cause computing device 102 to perform functions related to processing traffic and travel data. Such features will be discussed below in more detail.

System 100 also includes a travel server 108, which may be a server computer or other processing device that executes travel server application 110. Travel server 108 may be any type of computing device, such as a desktop computer, server computer, laptop computer, etc. that can execute travel server application 110. In embodiments, travel server 108 comprises one or more servers each executing a copy of, or executing part of, travel server application 110. Travel server 108 may have a network interface capable of communicating with mobile computing device 102 through network 106. Like the network interface of mobile computing device 102, the network interface of travel server 108 may be any type of network interface that allows travel server 108 to communicate over network 106 including, but not limited to: a Wi-Fi, GSM, LAN, WAN, or other type of network interface.

Travel server 108 may also include (or be in communication with) database 112 which can be used to store travel data. In embodiments, database 112 may be locally implemented by travel server 108 or may be remotely implemented by another server. In the latter case, travel server 108 may communicate with database 112 over a network the same as or similar to network 106. Database 112 may comprise one or more databases. For example, in an embodiment, database 112 consists of three databases to store raw data, data analysis related tables, and front-end information (e.g. for the web) interface.

User interface 114 is a user interface with which a user can interact with travel server application 110. User interface 114 may be implemented by travel server application 110 locally on travel server 108, or user interface 114 may be a remote user interface executed in whole or in part by another computer. In an embodiment, user interface 114 is a web interface provided by a web server and able to communicate with travel server application 110. User interface 114 may be executed and provided by travel server 108, which may be running a web server. Alternatively, user interface 114 may be executed by another server (either in a local or remote location) in communication with travel server 108.

Virtual machines may also be used to implement some or all of the computing devices shown in FIG. 1. In one embodiment, travel server 108 may comprise at least two servers: a master server and a slave server for back end analysis. Either one of these servers may run a virtual machine used as a web-server to host user interface 114.

In FIG. 1, network 106 is shown as a cloud to indicate that network 106 may be a single network or may be multiple networks in communication with each other that, alone or in combination, provide communication between mobile computing device 102 and travel server 108.

Figure 2:
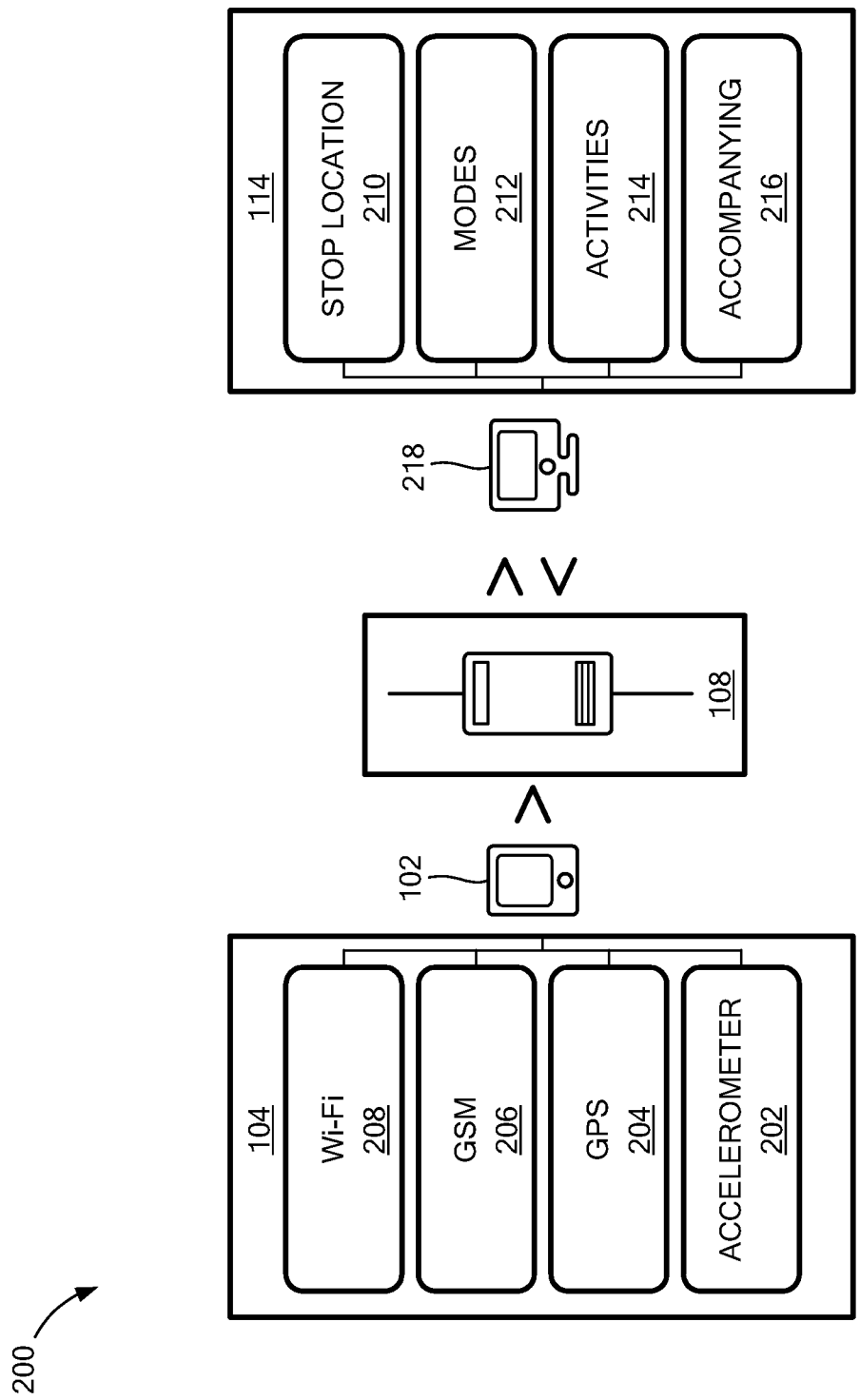
FIG. 2 is a block diagram of another embodiment of a system for collecting travel data.

Referring now to FIG. 2, traffic and travel survey system 200 may be the same as or similar to system 100 includes mobile device 102, having one or more various functional components that allow mobile traffic application 104 to collect data about a user's travels. These include an accelerometer module configured to access an accelerometer of mobile device 102, a GPS module 204 to access a GPS system of mobile device 102, a GSM module 206 to access GSM communication systems at device 102, and a Wi-Fi module 208 to access wireless network systems of mobile device 102.

Each of these modules can access the associated systems in mobile device 102 to collect data about the user's location and travel. For example, the accelerometer can be used to determine if a user is walking, running, or accelerating or braking in a vehicle. For example, a cyclical acceleration profile with a certain frequency can indicate if the user is walking or running. A sustained acceleration having a value between certain predetermined values can indicate the user is accelerating in a car that is either increasing speed, decreasing speed, or making a turn.

The GPS module can query the mobile device's GPS system to determine the location of the user, the direction of the user, the speed of travel of the user, etc.

The GSM module can access the phone's cellular network systems to determine the user's location by identifying a cellular tower that mobile device 102 is communicating with. Similarly, Wi-Fi module 208 can determine the user's location by identifying wireless networks that mobile device 102 is communicating with. Although wireless networks do not typically provide location information, mobile travel application 104 can associate wireless networks with particular locations. For example, mobile travel application 104 can build a local database that creates associations between locations (such as the user's home), and Wi-Fi networks (such as the user's home Wi-Fi network or any other Wi-Fi networks within proximity of the user's home).

Although not shown, a clock module may also be included to record the time associated with the user's travel. A timestamp can be added to any or all of the data collected by the other modules.

As mobile travel application 104 operates, modules 202-208 collect location and travel data about the user. Periodically, mobile application 104 can transmit to travel server 108 the travel data it has collected including the times the user traveled, the amount of time spent in each location, the speed of travel, etc. Once received, travel server 108 can process the data and make inferences about the user's travel based on the data received. These inferences include, but are not limited to, identifying a mode of travel and identifying one or more events associated with the user's travel. In other embodiments, mobile travel application 104 can identify the mode of travel and the events associated with the user's travel, which will be discussed below in more detail.

As shown in FIG. 2, user interface 114 may include a stop location module 210, a modes module 212, an activities module 214, and an accompanying module 216. In an embodiment, user interface 114 is designed to ask the user to verify inferences made by travel server 108 about the user's travel. For example, server 108 may infer, from the travel data it receives from mobile travel application 104, that the user made stops at home and at the convenience store; that the user's modes of travel included travel by bicycle, by train, and then walked to his or her office; that the user went out to a restaurant for lunch then went shopping at a nearby mall; and that the user was accompanied by one other person for lunch.

User interface 114 may ask the user to verify some or all of these inferences. Stop location verification module 210 may request verification that the user stopped at home and the convenience store; mode of travel verification module 212 may request verification that the user traveled by bicycle, train, and/or by walking; activities verification module 214 may request verification that the user went to the restaurant for lunch and went shopping; and accompanying verification module 216 may request verification that the user was accompanied by the other person for lunch. In an embodiment, information about whether the user was accompanied by another person is obtained through verification or historical context data, and not necessarily obtained as raw data collected by mobile travel application 104.

Computing device 218 in FIG. 2 may be a personal computer, tablet, or other computing device that can be used to display user interface 114.

Referring also to FIG. 3, process 300 is an example of a flow of operation of system 100. In block 302, a user can register with the system to begin travel data collection. User registration can be performed by accessing mobile travel application 104 on the user's mobile device. Once the user has registered, mobile travel application 104 may begin collecting (in box 304) data about the user's travels. In embodiments, once registration is complete, mobile travel application 104 will execute in the background on the user's mobile device to collect the data. Mobile travel application 104 may collect data continuously and/or collect data periodically (e.g. to reduce power consumption by not continuously accessing the mobile device's location systems).

In box 306, mobile travel application 104 may send the data it has collected to travel server 108, which may analyze the data as shown in box 308. During analysis, travel server 108 may make inferences about the user's travel based on the data, such as where the user stopped, what mode of transportation the user used, etc. In box 310, the system requests verification from the user about the inferences made. Verification can be achieved by the user confirming data and events via web interface 114.

FIG. 4 presents a block diagram of the data analysis process. Raw data collected via mobile application 204 may be uploaded to a database where travel server 108 may employ a series of algorithms to process the data and make inferences about stops, travel modes and non-travel activities. To minimize the user's interaction burden, the backend algorithms may translate raw data into trips and activities. Also, contextual data about the user's travel is also included in the analysis. The contextual data includes information about the user's travel history, points of interest in and near locations where the user traveled, weather information in use location and during the time of the user's travel, land use information for the area, special events taking place in the area, public transit routes, street maps, etc. The raw data collected by mobile travel application 104 may be combined with the contextual data so that travel server 108 can make accurate inferences about the user's travel.

Figure 5:
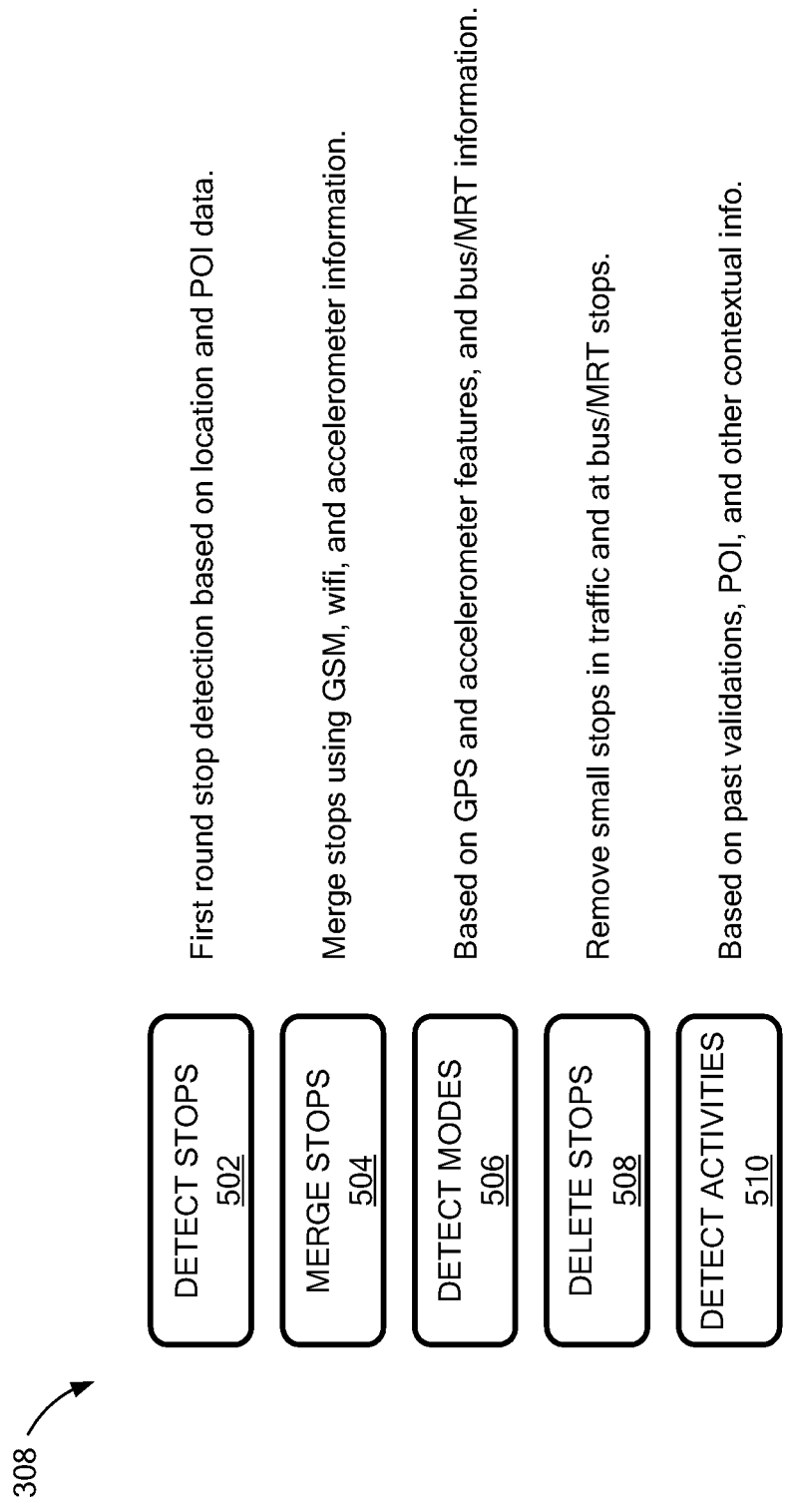
FIG. 5 is a flowchart of a process for analyzing travel data.

FIG. 5 is a flowchart of a data analysis process that system 100 may utilize. In box 510, GPS, GSM, accelerometer and Wi-Fi data collected from mobile travel are processed to detect stops made by the user. Travel server 108 may identify times during travel when the user stayed in a particular location for longer than a predetermined period of time. For example, GPS and GSM and Wi-Fi data may indicate that a user remains at a particular street address (e.g. 4 Yawkey Way, Boston, Mass. 02215) for a few hours.

Stop detection may be made based on location and point-of-interest (POI) data. In box 504, GSM, Wi-Fi and accelerometer information can be used to merge stops that would otherwise be interpreted as distinct stops. For example, if a user remains stationary in a particular area, the user's mobile phone connection may jump between nearby cell towers. Each jump can indicate movement of the user. However, travel server 108 can use accelerometer and Wi-Fi data to determine if these jumps represent travel by the user or cell tower hops or hand-offs. If, for example, GSM hops occur within a predefined radius, but the accelerometer data and Wi-Fi data indicate that the user did not travel, then the GSM hops can be merged (i.e. filtered out) to indicate that a single stop was made.

The system can also merge stops in other scenarios. For example, when there is no GPS data between two consecutive stops and there is overlap between the sets of Wi-Fi access points "seen" by the phone during these stops, this can indicate the user has been indoors for a long time, and there are jumps in the location data. Since Wi-Fi access points typically have a range of less than 50 meters indoors, it may be safe to assume that the user stayed in the same building throughout the two stops.

As another example, stops can be merged when the time elapsed between two consecutive stops is less than a predetermined amount of time (e.g. 3 minutes) and the distance between them is less than a predetermined distance (e.g. 150 meters), for example. These data can indicate the user made small, temporary stops while performing one activity, e.g., visiting a park.

As another example, stops can be merged when the two stops before and after a data gap (a period of time where no data is collected) are at the same location. If a user switches off his or her phone at night before going to bed and turns it back on in the morning, the data may include two candidate stops. In other words, powering the mobile device on and off can create a false stop in the data. These stops can be merged to eliminate the false stops. In like manner, false trips are merged. For example, a false stop in the data may break a trip into different segments that appear to each be short trips. As the false stops are merged, the false trips can also be merged to accurately reflect the trip taken by the user.

In box 506, travel server 108 can detect a mode of travel of the user. GPS and accelerometer data can be used along with public transportation maps and times, street maps, and other contextual data. For example, if the user was traveling at 15 mph along a bike path, the system can infer that the user was traveling by bicycle (i.e. the mode of travel was a bicycle or some other form of a human powered device— e.g. skateboard, roller blades, etc.). If the user was traveling at 30 mph along a street, the system can further infer the user was traveling by motorized vehicle (i.e. the mode of travel was a motorized vehicle such as a car, bus or motorcycle). If the user's travel along the street follows a predefined bus route, the system can infer the user was traveling by bus. If the user is traveling at 3 mph and accelerometer data indicates a cyclical walking pattern, the system can infer the user was walking. The system can also compare the data to various other travel profiles to determine the mode of transportation used by the user.

In box 508, certain stops may be deleted from the data. For example, short duration stops that are relatively insignificant from a data validation standpoint (such as stops in traffic or at bus stops or subway stations) are deleted for the purposes of presentation in the web interface. Non-travel activities (e.g. home, work, shopping, drop-off) are also detected based on previous validations by the user, POI data and other contextual information.

In box 510, the system may detect activities of the user during travel by using a history of the user's activities, points of interest along the user's route, and other contextual information.

To illustrate the process, an example is now described. In box 502 the system may use GPS and Wi-Fi to detect that a user first traveled for a period of time (e.g. a few hours) to arrive at a particular address (for example, 4 Yawkey Way, Boston, Mass. 02215) for a period of time (e.g. a few hours) then stopped for a few hours at the address. In box 504, the system may recognize that, while the user remained at this address according to GPS and accelerometer data, the user's cell phone connection hopped between nearby cell towers. Thus, based upon the GPS and accelerometer data, the system can infer that the hops between cell towers were not due to actual travel by the user. The traffic and travel survey system can merge the GPS hops into a single stop.

In box 506, the system may recognize that the user traveled along a bus route at an average of 30 mph to arrive at a bus stop a certain distance (e.g. 3 blocks) from the address. Subsequent accelerometer and GPS data may indicate the user walked the remaining three blocks to the address. In box 508, the system may similarly detect any small stops, such as waiting at a stoplight or at a bus stop and delete such stops from the data (or from the data that is to be subsequently validated by the user). In box 510, the system may use contextual information to determine, for example, that there is a baseball stadium at the address, that a baseball game was scheduled for the time the user remained at the address, and/or that the user has indicated through past validations that he or she attends baseball games, to infer that the user's activities during this trip included attending a baseball game at Fenway Park.

Figure 6:
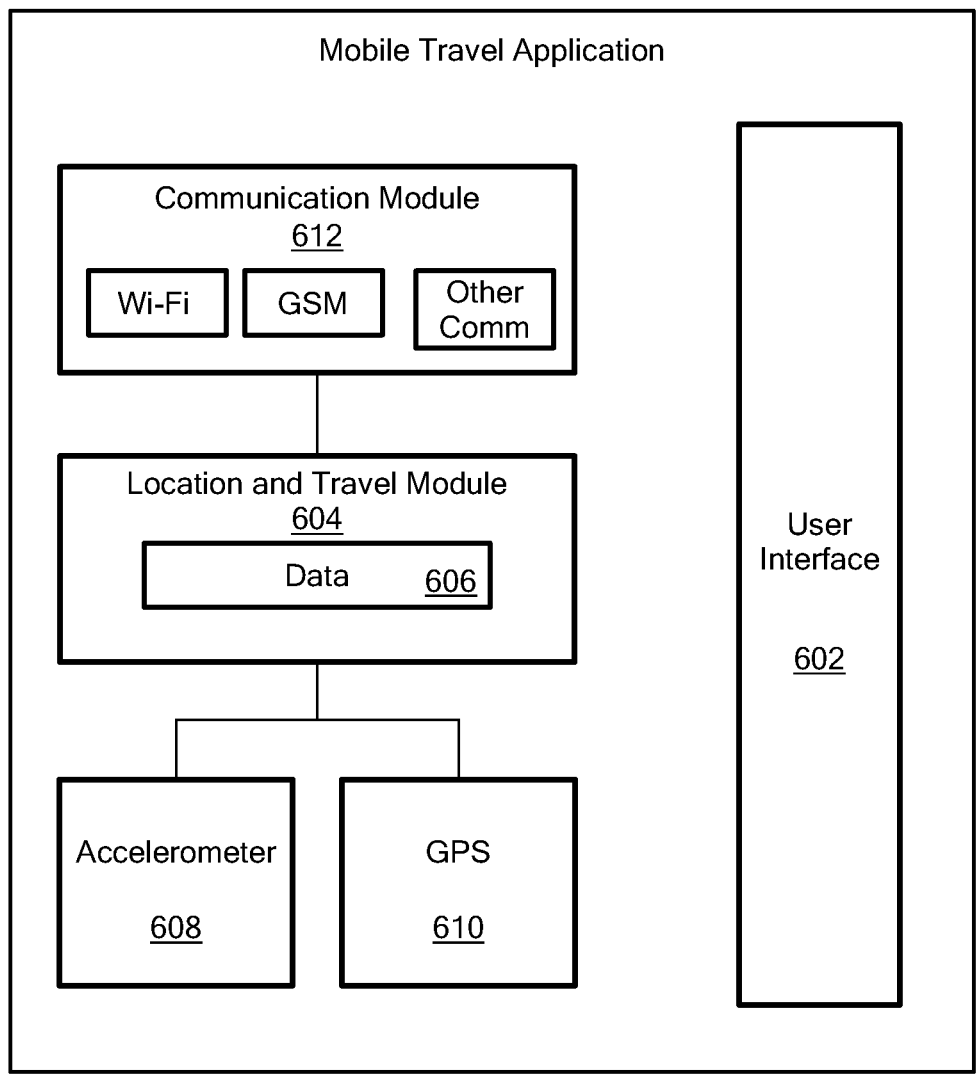
FIG. 6 is a block diagram of a mobile device executing a mobile travel application.

Referring to FIG. 6, a processor executing a mobile travel application includes a user interface module 602, which implements a user interface on the user's mobile device. In an embodiment, user interface module 602 only presents a user interface during initial setup and/or during administrative events like updating the application and does not present a user interface while collecting data. During normal operation, mobile travel application 104 may operate in the background without providing a user interface.

The mobile travel application may also include a location and travel module 604 to collect location and travel data 606 regarding the user's activities. Location and travel module 606 may be coupled to an accelerometer module 608 and a GPS module 610 to collect accelerometer data and GPS/location data from a mobile device.

Mobile travel application may also include a communication module 612. The communication module 612 may be in communication with communication systems of the mobile device such as Wi-Fi, GSM and/or other communication systems like Bluetooth communications, etc. The communication module can be used to collect location information from the mobile device's Wi-Fi, GSM, and other communication systems. Communication module 612 may also be configured to transmit the data 606 that has been collected to travel server 108.

Figure 7:
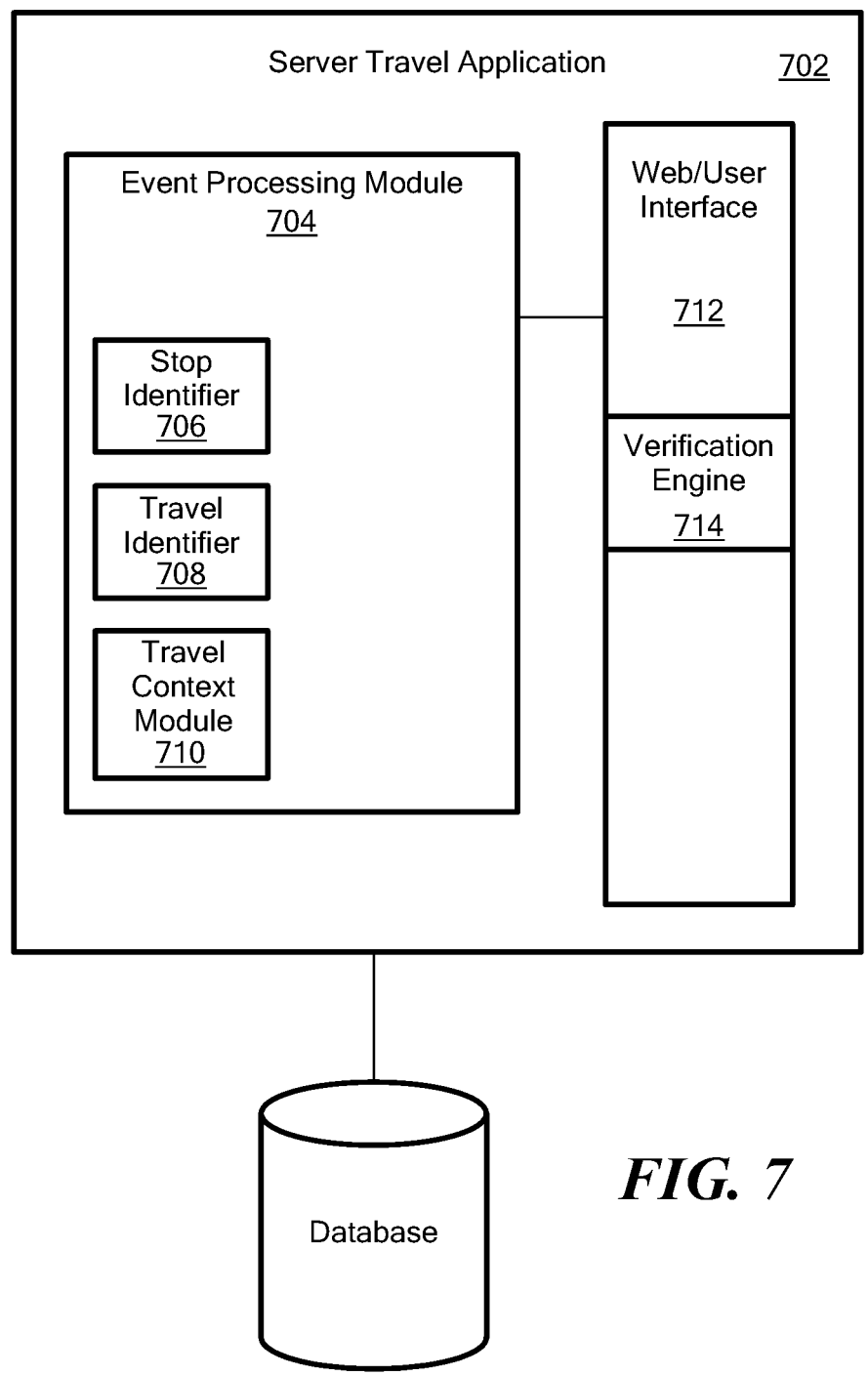
FIG. 7 is a block diagram of a server executing a server travel application.

Referring now to FIG. 7, a travel application 702 which may be executed by travel server 108 is shown. Sever travel application 702 may include an event processing module 704 to process the travel data received from mobile travel application 104. Event processing module 704 may include a stop identification module 706 to identify and merge stops made by the user, a travel identification module 708 to identify a mode of travel by the user, and a travel context module 710 to collect contextual data and identify activities of the user during travel. Event processing module 704 may operate to make inferences about the user's travel, as described above.

Server travel application 702 may also include a web interface 712 having a verification engine 714. The web interface and verification engine may request verification, from the user, of the inferences made by event processing module 704 about the user's travel.

Figure 8:
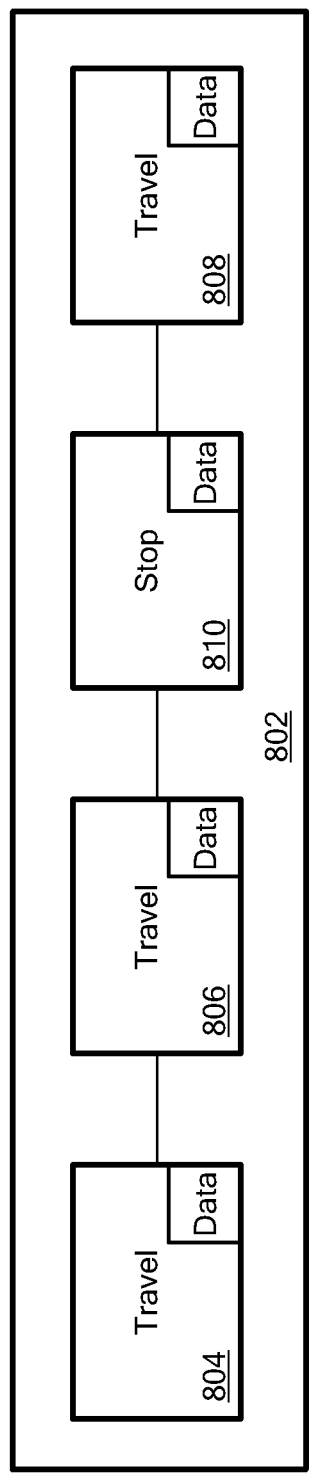
FIG. 8 is a block diagram of a data structure for travel data.

FIG. 8 is a block diagram of data that may be collected by mobile travel application 104 and/or processed by travel server application 108. In an embodiment, the processed data may be arranged into a so-called journey 802 so that it can be presented to and verified by the user. Each journey may include travel events, such as travel events 804, 806 and 808, representing travel undertaken by the user. For example, travel event 804 may correspond to a car trip taken by the user, travel event 806 may correspond to a walk, travel event 808 may correspond to a subway ride, etc. Each journey may also include stop events, such as stop event 810. Stop event 810 may correspond to a stop made by the user, for example a stop at work, at a shopping mall, etc.

Each travel or stop event has associated data which can include, but is not limited to: location, speed of travel, accelerometer data, duration and time data, or any other type of data related to the travel. The data may also include inferences made by travel server application 702 as described above, including inferences about the mode of travel and the type of activity.

FIGS. 9-12 show various user interface screens that can be presented by web interface 114. Additionally or alternatively, some or all of the user interface screens may be presented by mobile web application 104 on mobile device 102.

FIG. 9 shows a screenshot of a user registration interface 900. User registration interface 900 may request information from the user to create a profile during registration. As shown in FIG. 9, the information may include demographic information such as age, gender, marital status, employment, education, race, income, etc. Although not shown, user registration interface 900 may also request information about the user's housing; mobility information such as driving record, preferred modes of transportation; and frequently visited places such as addresses for work and home or other frequently visited places. The information provided during registration can comprise at least part of the contextual information described above.

Figure 10:

FIG. 10 is a user interface that can be used to verify a user's travel activities. Panel 1002 displays a journey that the user undertook and includes buttons 1004 that the user can press to indicate whether each event in the journey is accurate. Each line item in panel 1002 may correspond to an event of the user's travel (e.g. each line item may correspond to a travel or stop event in a journey such as journey 802). Each circle may indicate a stop or destination of the user. From top to bottom, the travel events in FIG. 10 show that the user spent 14 hours and 9 minutes at Shelford Rd., then traveled by car or van for 11 minutes, then remained at Namly Crescent for 10 minutes, then traveled by car or van for 23 minutes, then remained at Create Way for 30 hours and 46 minutes. The user can verify any or all of these events by pressing the associated check box 1004 shown on the right side of the panel. Each line item also includes a start time for the event.

Figure 11:
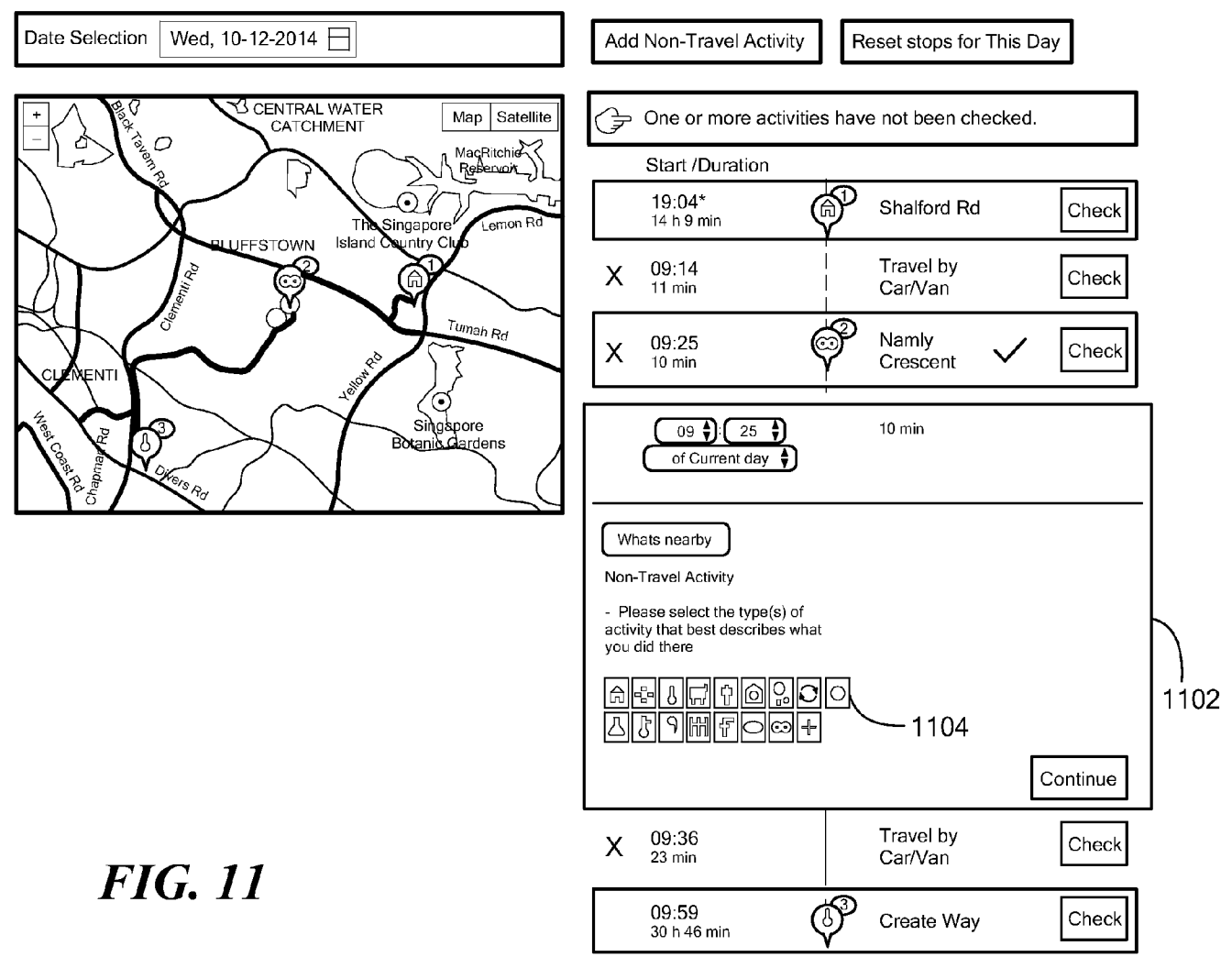

FIG. 11 shows the user interface with a panel 1102 that may be presented when the user presses one of the check buttons 1004. Panel 1102 allows the user to edit the event including the date and time. Panel 1102 also requests that the user enter information about his or her activities at the location. The user can select from icons 1104, for example, to choose an activity such as shopping, eating, work, etc.

Figure 12:
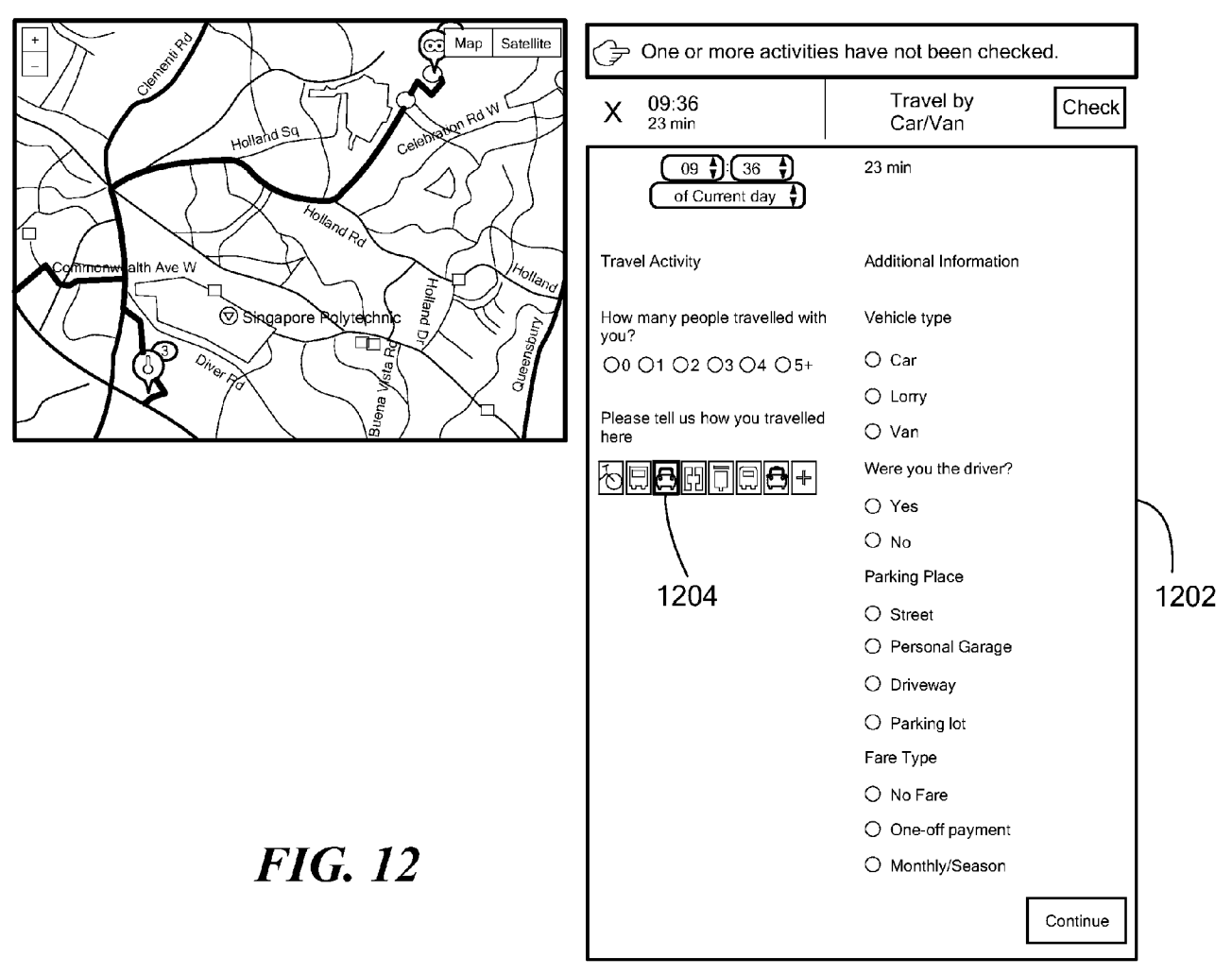

FIG. 12 shows the user interface with a panel 1202 that may be presented to check the user's mode of travel. The user may choose from an icon 1204 to verify the mode of travel (e.g. car, van, bicycle, train, etc.). The user may also indicate (via radio buttons in this example) how many people were traveling and additional information about the travel, such as vehicle type, who was driving, parking place, fare type, etc.

Figure 13:
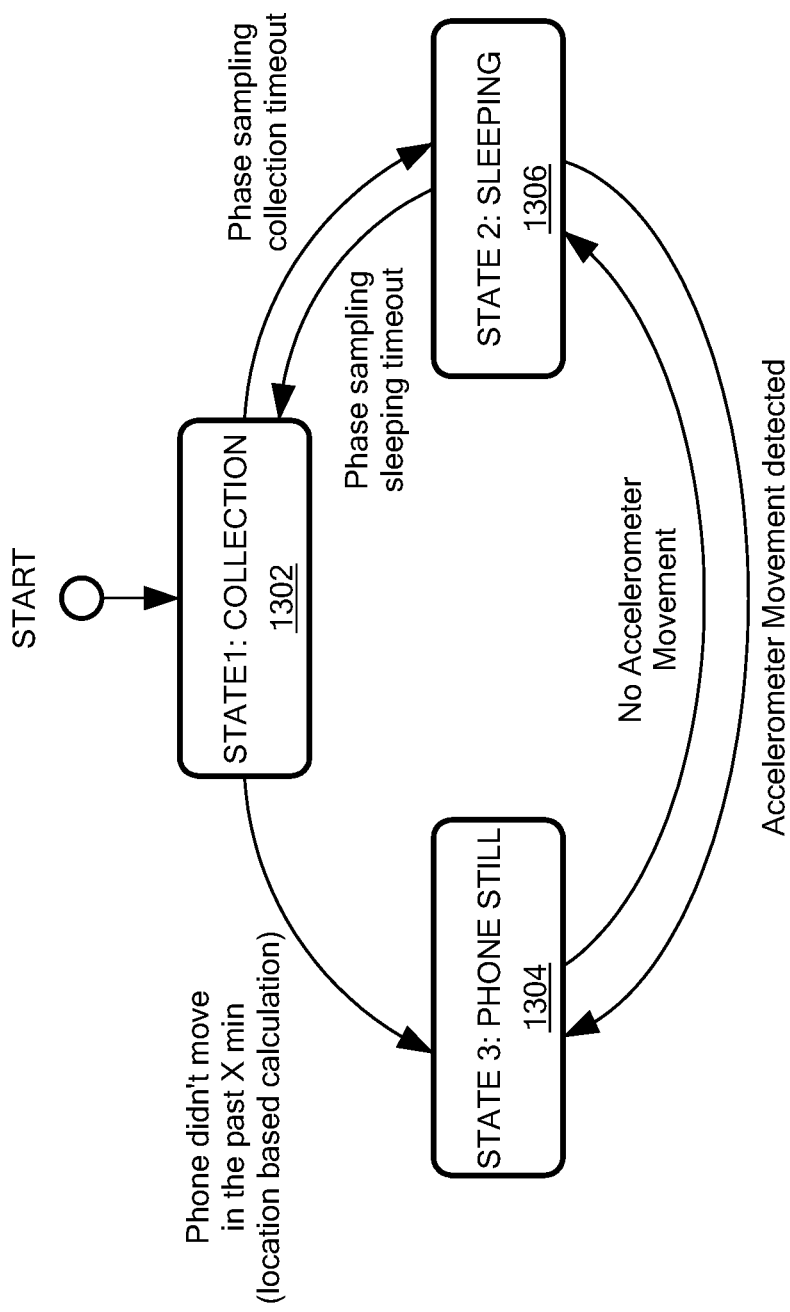
FIG. 13 is a state transition diagram for reducing power consumption during collection of travel data.

Referring now to FIG. 13, a state machine illustrates power saving features of mobile travel application 104. The state machine may reduce the use of GPS to minimize battery power consumption. In block 1302, mobile travel application 104 may be active and collecting data from the sensors and systems of mobile device 102. If, according to GPS or other location data, the phone did not move for a predetermined amount of time, the state machine may advance to a phone still state in block 1304. Subsequently, if the accelerometer indicates that no movement is detected, the state machine may advance to a sleeping state in block 1306. During the phone still state and/or the sleeping state the GPS may be deactivated in order to reduce power consumption.

In an embodiment, the verification engine may include logical checks to determine whether the data entered by the user is consistent with the data collected by mobile travel application 104. For example, if a user enters information indicating that the user was walking during a time period where the data from mobile travel application 104 indicates that the user was traveling at 55 mph, then the verification engine may flag the data entered by the user as inconsistent with the collected data. Inconsistent data may be submitted to the user for re-verification or may be discarded if desired.

Figure 14:
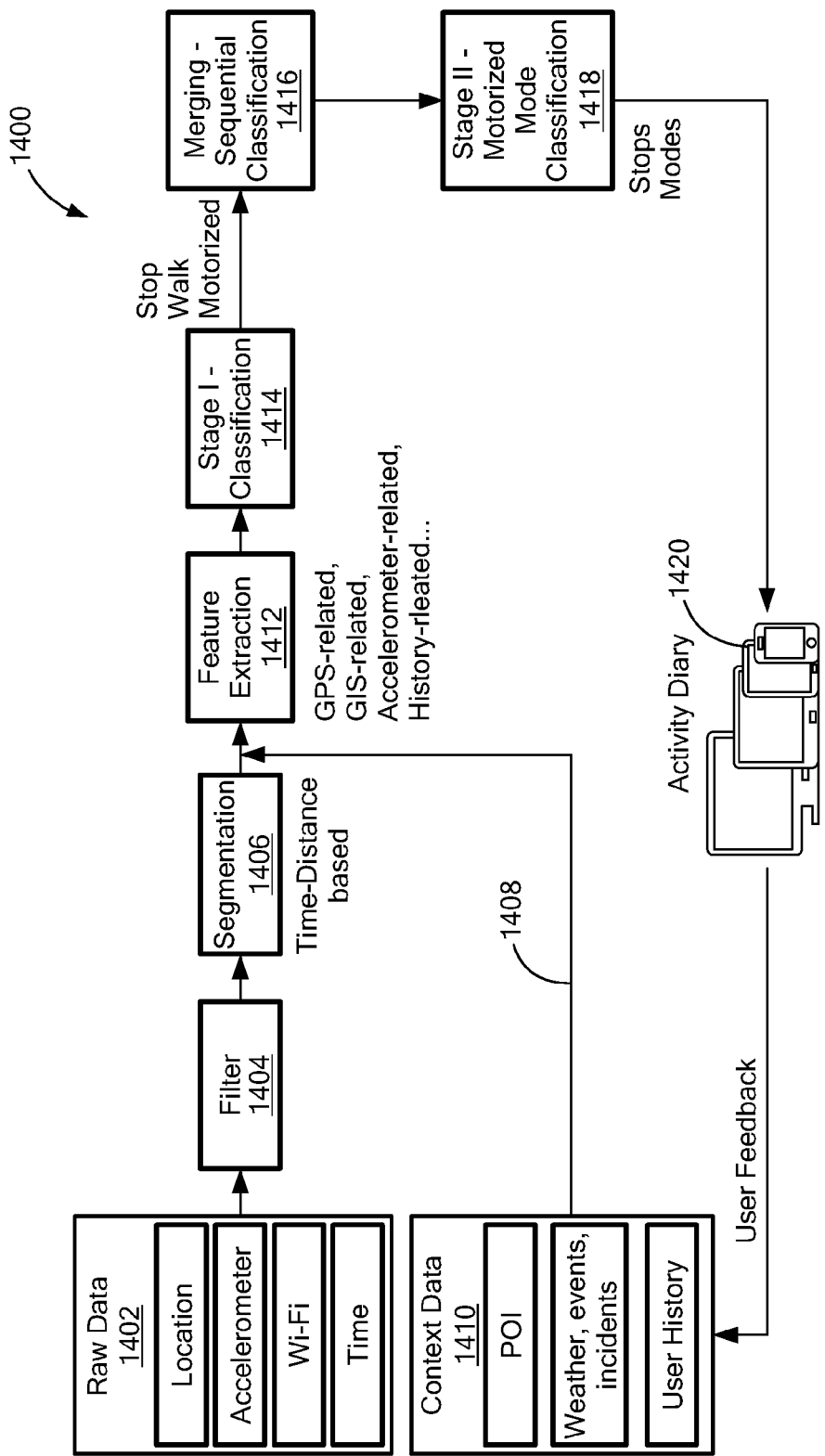
FIG. 14 is a flow diagram of a process of processing travel data.

Referring to FIG. 14, a process 1400 for analyzing traffic data begins in block 1402 where raw data is received by travel server application 110 from mobile travel application 104 and may include location data, Wi-Fi data, accelerometer data, time data, etc., as described above. In an embodiment, mobile travel application 104 may implement, in whole or in part, process 1400.

In block 1404 server travel application 114 may filter out low accuracy location data from the data received. In many situations, such as inside a subway or tunnel, mobile computing device 102 may not have access to GPS location services. In the absence of GPS location service, mobile computing device 102 may report estimated location based on GSM triangulation and known Wi-Fi access points in the area. GSM triangulation and/or Wi-Fi access point location, without GPS location, may be a relatively inaccurate source for location measurement. In embodiments, location measurements from known inaccurate sources can be filtered out of the data by travel server application 110.

Each measurement from mobile computing device 102 may also have an accuracy measurement. The accuracy measurement can be due, at least in part, to a type of measurement source as listed above. If the accuracy error of the measurement is greater than a predefined threshold (say 500 m, for example), the travel server application 110 may filter the data out of the raw data received.

In block 1404, travel server application 110 may segment the data into different sections based on time and/or distance threshold. For example, one segment may consist of data chosen from taking within 5 minutes and/or having a location within 200 meters of a first data point. The time threshold may be set so that data points within a collection time period are included within the threshold. For example, in an embodiment, location data is sampled for three minutes followed by a two-minute sleeping. In such an embodiment, a 5-minute threshold, for example, is long enough to ensure that all samples within a three-minute collection time are included in the same segment unless the distance threshold is exceeded. The time threshold can be chosen to be long enough to include sufficient information to make inferences and short enough to contain a single individual segment. The distance threshold can be chosen to differentiate stops from other types of modes.

As shown by arrow 1408, contextual data from block 1410, including data from outside sources and data validated by the user, may be included with the raw data once the raw data is segmented in block 1406. For example, if a segment includes location data for a particular location, validated data and data from external sources relating to that location can be included in the segment. Examples of contextual data include historical data that the user takes a bus from a bus stop at the location, a list of events, points of interest at the location, etc.

In block 1412, statistical features may be extracted for each segment. These features may include but are not limited to those listed in the following table.

TABLE 1

| Data Type in Segment | Statistical Features |
| --- | --- |
| Speed | Average, minimum, maximum, standard deviation |
| Latitude, Longitude | Average and maximum vicinity distance from mean |
| Accelerometer Magnitude | Average, minimum, maximum, standard deviation, coefficient of variance, interquartile range |
| Digital Fourier Transform (e.g. of Accelerometer Data) | Peak frequency, normalized relative energy in five intervals and its standard deviation, peak interval |
| Point of Interest | Minimum and average distance and density |
| Validated stops/modes of transportation | Minimum and average distance and density |
| Deleted stops/modes of transportation | Minimum and average distance and density |
| Wi-Fi | Common Wi-Fi access points |
| Public transit network data | Common public transit line |
| Segment | Time duration, time and distance gap |

Accelerometer data may include measurements for three orthogonal axes, to provide a three-dimensional direction of the acceleration. In an embodiment, the magnitude of the acceleration ($f_a$) may be computed by taking the square root of the sum of the squares of the measurements. Subsequently, statistical data such as average, minimum, maximum, standard deviation, coefficient of variance, interquartile range can be derived from the magnitude $f_a$.

The Fourier transform of the magnitude $f_a$ can be used to determine peak frequency of the acceleration. Also, because the size of each data segment may be dynamic and based on the length of accelerometer data within the segment, the normalized relative energy of the Fourier transform may be taken across a predetermined number (e.g. 5) bins instead of across all coefficients of the power spectrum. The following formula may be used:

$$I_j = \frac{\sum_{b_{j-1} \leq \frac{2i}{N} \leq b_j} \|f_j\|_2}{E_i \|f_j\|_2} \forall \ j \text{ and } \forall \ i = 1, 2, \ldots, N \quad (1)$$

Formula 1 above may calculate the frequency spectrum as divided into j equal intervals $b_j$, where for each interval $b_j = j/\max(j)$. N may be the number of accelerometer points in the data segment.

From the frequency transform equation above, the standard deviation of the relative sums may be computed, and the bins may be indexed according to maximum interval distribution:

$$\left\{\frac{j \mid \operatorname{argmax}(l_j)}{j}\right\} \quad (2)$$

Temporal features may also be computed from the data. Temporal or time-based features can be used, for example, to determine whether a user was waiting at a bus stop, attending a local event, traveling, etc. To calculate temporal features the time of day may be sectioned into multiple windows. In one example, the sections may be peak travel time, non-peak travel time, night time and other. These sections can assist in making inferences about the user's travel. For example, a user may be more likely to be at a stop during the night time and more likely to be traveling during the peak travel time.

In an embodiment, the time sections may be defined as:
Peak Travel time: 06:00 to 10:00 and 19:00 to 20:00
Non-Peak Travel time: 10:00 to 17:00 and 21:00 to 22:00
Night time: 22:00 to 06:00
Other: any other time In addition, travel patterns may differ between weekdays and weekends. A flag representing whether the data was collected on a weekday or weekend may also be added to the data.

Geographic Information Systems (GIS) features can also be identified in the data. GIS features may include public transportation information, local points of interest, and other referenced data. Often it is not possible or practical to obtain real-time public transit information such as whether a bus or train is running on time. Therefore, historical and statistical information about public transit routes may be used. This information can be used to make inferences about the user's travel. For example, a user may be more likely to be stopped at a parking lot, taxi stand, restaurant or stadium. As another example, a proximity to a train line is indicative of train travel.

Points of interests (POI) extracted from OSM and public sources such as information from land use or municipal databases can be used to represent this type of GIS info. Open street map (OSM) and Service-Level Agreement (SLA) information may be used to categorize POIs into multiple types or hierarchies representing increasing levels of details. Examples of POI categories include, but are not limited to: Parking lot, Bus Stop, Train Stop, Shops, Recreation, Eating place, Education, Amenities, Religious, Health, Taxi, Train route, Bus route, etc.

For each segment (or for one or more of the segments), travel server application 110 may also determine the density of POIs in a segment, as well as minimum and average distance between or among POI locations in the segment and/or each type of POI within the segment.

As noted above, users of the system can access their data through a web interface to verify accuracy. Each user may log in to their account and validate the stops, modes and activities that were recorded by the system. This validation history may be used to calculate spatial features for the user. For example, for a segment of data, minimum and average distances from the user's validated or deleted stops and their densities can be determined.

In block 1416, travel server application 110 may perform a first state classification of the segment to determine what type of segment the data represents. The type of segment may include a motorized travel segment, a walking travel segment, and/or a stop segment.

The segments may also be classified as motorized travel. Travel server application 110 may evaluate acceleration profiles and maximum, minimum, and average speed for each segment. If the acceleration profile matches (or falls within range) of a predetermined profile for a motor vehicle, travel server application 114 may classify the data segment as a motor vehicle travel segment.

A random forest (RF) classifier algorithm with a predetermined number of trees is trained using any or all of the features extracted in block 1412. In an embodiment, the classifier algorithm includes about 100 trees. The RF algorithm may be a learning algorithm that is capable of handling missing data (such as gaps in data due to mobile computing device 102 being turned off, or a gap in map data from outside map databases, for example) and has the ability to deal with high dimensional data. In case of missing values, the RF algorithm may split, average, or perform other observations to interpolate or extrapolate the data. The RF algorithm may apply weights representing a most probable type of segment to the leaves of the trees in order to choose the most probable class for the segment.

In block 1416, segments classified as stop segments may be merged to remove or combine certain types of false stops along a travel route, including but not limited to waiting at a stop sign, waiting at a stop light, stops due to heavy traffic, stops due to public transportation stops along a bus or train route, etc. In many cases, if the data segments are arranged sequentially based on the time of the data, merged stops will be adjacent to or near one another in the sequence of segments. Thus, the merging operation will operate on multiple data segments to identify stops that can be merged.

Various criteria may be examined to determine if segments should be merged including, for example, whether a common bus line passes through two consecutive segments, whether a common train line passes through two consecutive segments, and/or whether the same Wi-Fi access point was recorded at both the segments. The presence of these conditions can increase the probability that the stops should be merged.

The classification determination made in block 1414 may also be used as a criterion to determine if segments are merged. Conditional random fields (CRF) are discriminative undirected graphical models usually used in labelling sequential data. Travel server application 110 may use CRFs for merging the segments due to the ability of CRFs to produce unbiased sequence labelling. In an embodiment, the first order Markov constraint may be relaxed and the third order linear chain CRF used. Stochastic gradient optimization or other estimating and/or learning algorithms can be used to improve the classification.

In addition, during the merging process intermediate traffic stops and the like can be differentiated from gaps in data due to the mobile computing device 102 being shut off, etc. Typically, intermediate travel stops will be shorter in duration than false stops due to gaps in data.

In box 1418, data segments that were classified as motorized travel may be further classified to identify a type of motorized travel: car, bus, train, etc. In an embodiment, travel server application 110 makes the assumption that a motorized travel segment is followed by a walking travel segment or a stop travel segment, due for example, to the frequent requirement that a bus ride, car ride, or train ride is followed by the user arriving at or walking to his or her intended destination. Given this assumption, the travel server application 110 also incorporates stop and walk segments within 30 minutes of a motorized travel segment; GIS features from previous and subsequent stop and walk segments; and densities, averages, and minimum distances for parking, bus stops, taxi stops, etc. into the decision algorithm. To classify the type of motorized travel, travel server application 110 may again use a random forest classifier with a predetermined number of trees (e.g. 100 trees) to train on these elements and determine a type of motor travel for the segment.

In block 1420 the data segments may be presented to the user as a journey for verification, as described above. The verified data may then be stored in a database and/or become part of the historical and/or contextual information as described above.

Figure 15A:
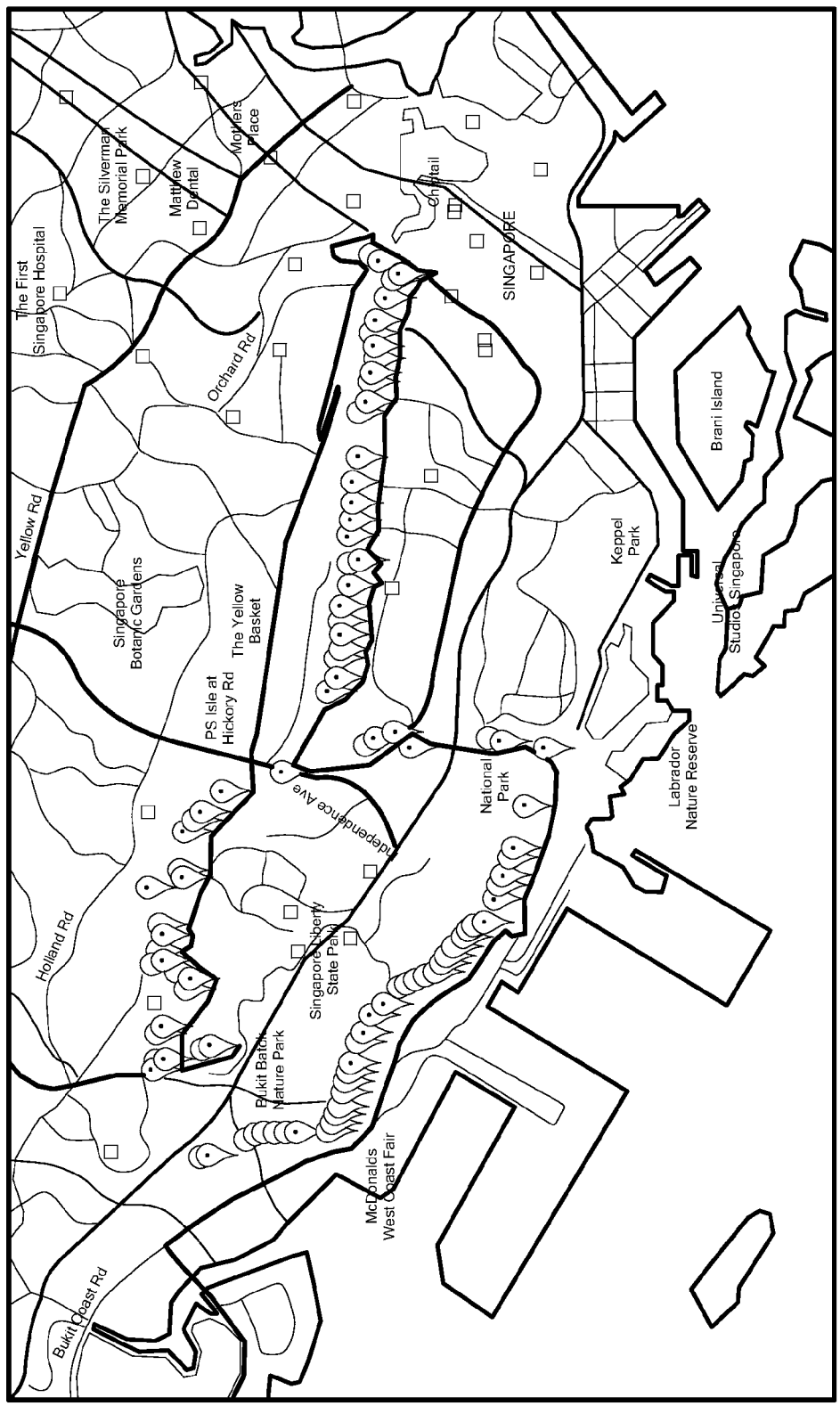
FIG. 15A is a plot of raw travel data overlaid on a map.
Figure 15B:
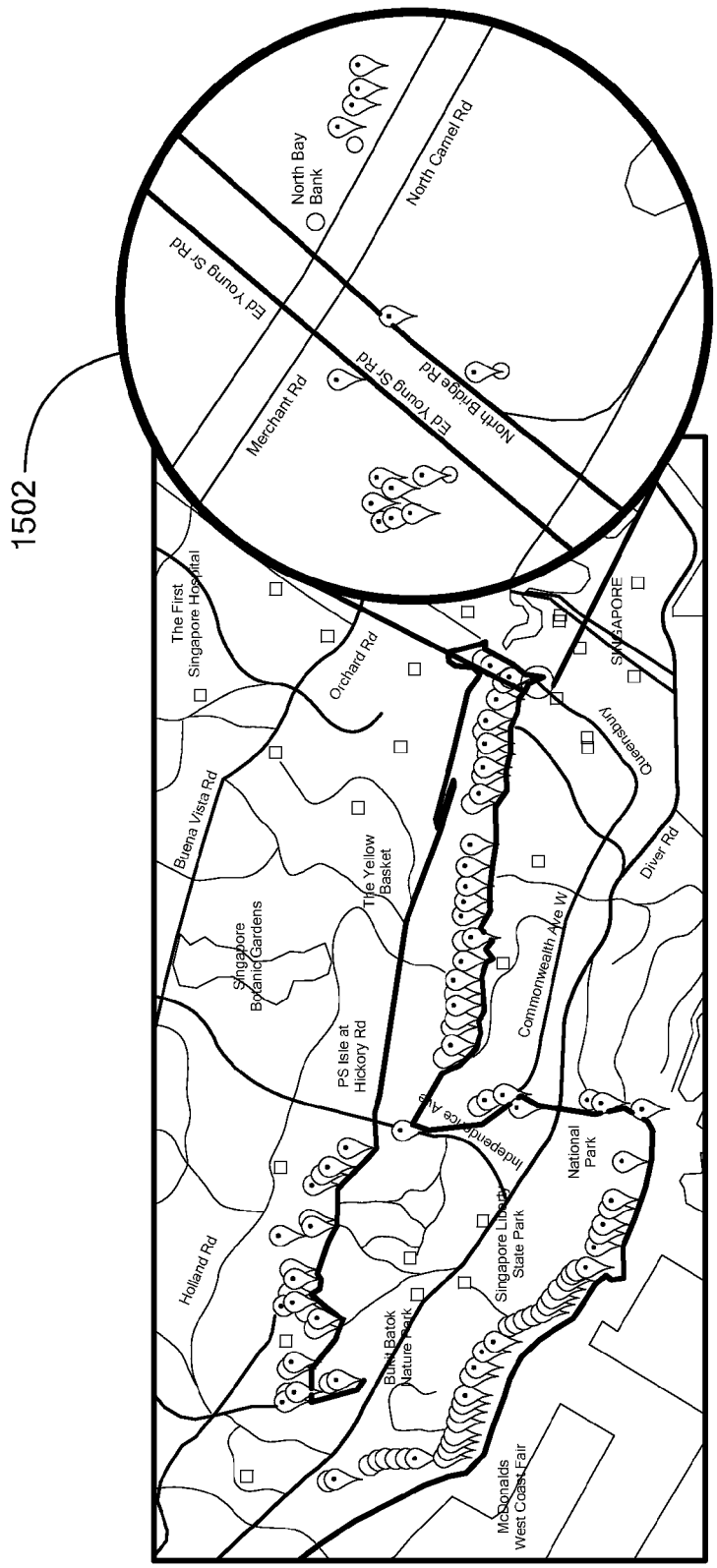
FIG. 15B is a plot of filtered and segmented travel data overlaid on a map.
Figure 15C:
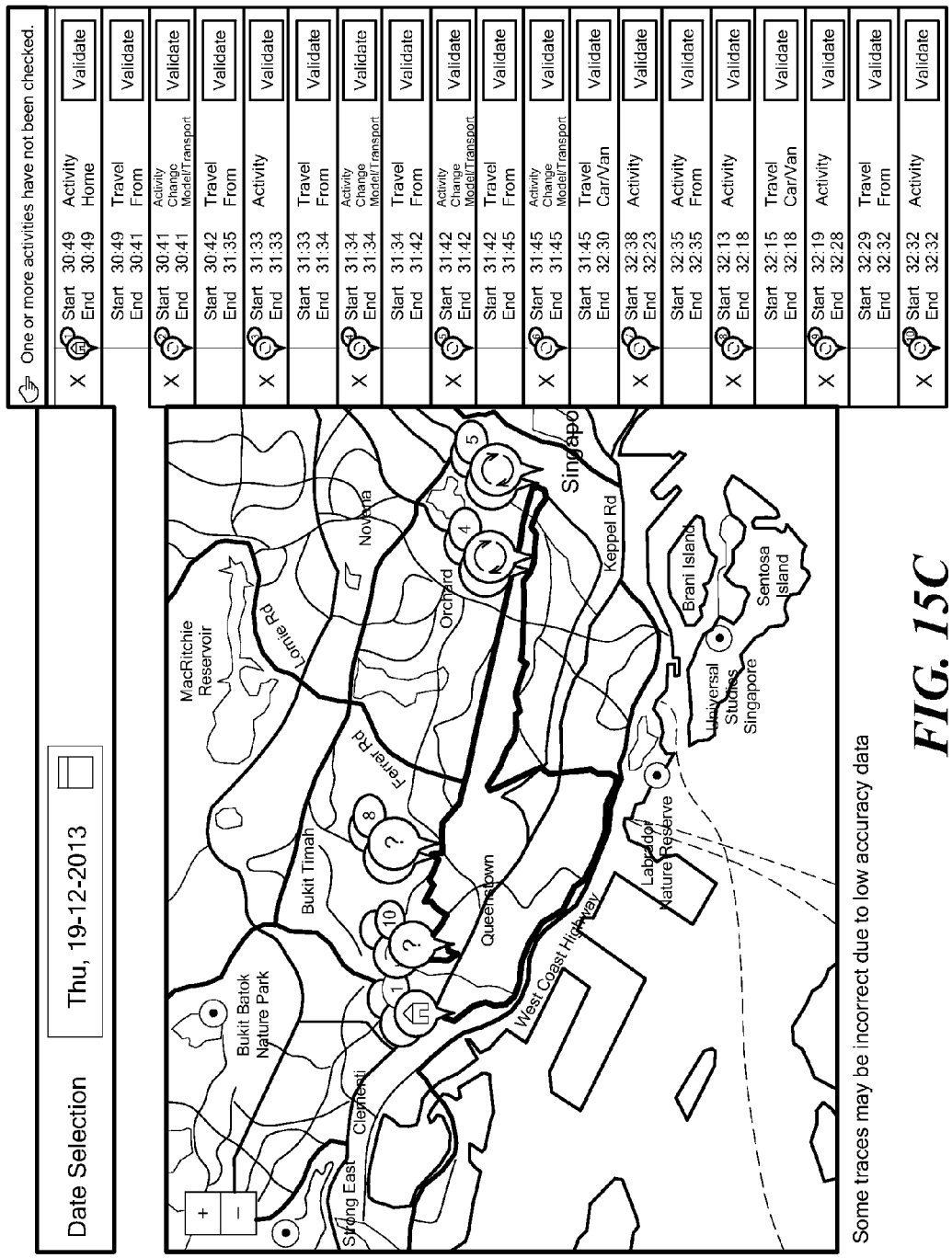
FIG. 15C is a plot of merged and characterized travel data overlaid on a map.

Referring to FIG. 15A, a plot of raw data collected from a user is displayed on a map. In FIG. 15B, the data has been filtered and segmented by blocks 1404 and 1406, and contextual data has been added. For example, points of interest may be overlaid on some or all of the segments as shown by breakout circle 1502. In FIG. 15C, the segments have been categorized as motorized travel segments, walking segments, and stops, and may be presented to the user for verification.

FIG. 16 is a block diagram of a computational circuit 1600, which can perform at least some of the processing described above. In embodiments, mobile computing device 102 and/or travel server 108 may comprise the same or similar architectures as computational circuit 1600 in order to execute mobile travel application 104, mobile server application 114, and/or other applications. Computational circuit 1600 may include a central processing unit (CPU) 1602 coupled to a storage device 1604 and a memory 1606. CPU 1602 can be a general-purpose processor, a custom-designed processor, a microprocessor, or any other type of processor or circuit that can execute software instructions.

Storage device 1604 comprises a non-volatile memory such as a ROM, flash memory, F-RAM, solid-state drive, etc. Storage device 1604 may be either read-only or read/write. In other embodiments, storage device 1604 is a hard-drive, DVD, CD, or other type of disc device.

Memory 1606 comprises a volatile memory, such as a RAM. In certain embodiments, RAM 1606 may be omitted from computational circuit 1600.

In operation, CPU 1602 may read and execute software instructions from storage device 1604. When executed, the instructions may cause CPU 1602 to perform functions and operations as described above. In certain embodiments, CPU 1602 may copy the instructions from storage device 1604 to memory 1606 prior to executing the instructions. CPU 1602 may also read and write data to and from storage device 1604 and memory 1606. In other embodiments, computational circuit 1600 may comprise programmable hardware logic (e.g. a PLA), an FPGA, an ASIC, or any other type of hardware circuit or device capable of performing at least some of the functions described above and/or executing software instructions that cause the computational circuit to perform at least some of the functions described above.

The embodiments should not be limited to the disclosed embodiments but rather should be limited only by the spirit and scope of the appended claims. All publications and references cited herein are expressly incorporated herein by reference in their entirety.

The invention claimed is:

1. A system for processing travel-related data, the system comprising:
   a mobile computing device;
   a mobile application configured to execute on the mobile computing device and collect and store in a memory travel data including position of the mobile computing device as the mobile computing device moves so as to collect and store in the memory travel date representing a history of movement of the mobile computing device with the history of movement corresponding to a journey and the travel data representing one or more travel events and one or more stop events taken by the mobile computing device in the journey, and wherein the mobile application is configured to communicate the travel data representing the journey over a network;
   a networked data processing device coupled to receive the travel data from the network and analyze the one or more travel events to identify a mode of travel taken by the mobile computing device during at least one of the one or more travel events; and
   a graphical user interface that allows a user of the mobile computing device to verify accuracy of the identified mode of travel by presenting the identified mode of travel and a graphical element with which the user can confirm that the identified mode of travel corresponds to the mode of travel taken by the mobile computing device;
   wherein the data processing device is configured to receive the identified mode of travel after it has been verified and analyze subsequently travel-related data based on the identified mode of travel.

2. The system of claim 1 wherein the data processing device is further configured to identify one or more events associated with the travel of the mobile computing device, and the graphical user interface is further configured to allow the user to verify accuracy of the identified one or more events.

3. The system of claim 1 wherein the data processing device is configured to compile a series of travel activities and stop activities based on the travel-related data.

4. The system of claim 3 wherein the data processing device identifies the means of travel by analyzing the travel activities and stop activities to determine one or more of: a speed of travel, a location of travel, an apposition of the locations of the travel to public transportation routes, and an apposition of times of the travel to public transportation times.

5. The system of claim 1 wherein the data processing device is configured to identify whether the data indicates the mobile computing device is stationary or traveling by analyzing cellular hand-off data included in the travel data and, to determine that the device is stationary if one or more of accelerometer data and cellular data indicate no change in location when the hand-offs occur.

6. The system of claim 1 wherein the data processing device is configured to identify whether the data indicates the mobile computing device is stationary or traveling based on one or more of: GPS data, accelerometer data, cellular data, and Wi-Fi data.

7. The system of claim 3 wherein the data processing device is configured to determine a type of the stop activities based on proximity of the mobile computing device to an area or structure.

8. The system of claim 1 wherein the graphical user interface allows a user to verify the identified means of travel by entering a type of travel.

9. The system of claim 8 wherein the data processing device is configured to verify whether the type of travel entered by the user is consistent with the travel-related data.

10. The system of claim 1 wherein the data processing device is a server computer.

11. The system of claim 1 wherein the graphical user interface is a web interface.

12. The system of claim 1 wherein the mobile application is capable of disabling use of GPS systems to reduce battery consumption.

13. A method comprising:
executing, by a mobile computing device, an application that collects travel data including position of the mobile computing device as the mobile computing device moves so as to collect a history of movement of the mobile computing device, the history comprising a journey having travel data representing one or more travel events and one or more stop events taken by the mobile computing device;
transmitting the travel data representing the journey to a central server;
analyzing the journey by the central server to:
identify one or more modes of travel undertaken by the mobile computing device by analyzing the one or more travel events;
identify one or more activities associated with the movement of the mobile computing device by analyzing the one or more stop events;
providing a web interface including features to verify the modes of travel and activities associated with the movement of the mobile computing device; and
identifying whether a mode of travel entered by a user via the web interface is consistent with the history of travel.

14. The method of claim 13 wherein the web interface is configured to present the journey to the user for verification.

15. The method of claim 13 further comprising identifying the activities based on contextual data.

16. The method of claim 15 wherein the contextual data includes one or more of: past verifications made by the user, maps of the area, local events in the area, and land use information.

17. The method of claim 13 further comprising collecting registration information about the user.

18. The method of claim 17 wherein the registration information includes one or more of: age, gender, marital status, employment information, education, race, income, housing information, mobility information, and frequently visited places.

19. A method comprising:
collecting, by an application executing on a mobile computing device, travel data including position of the mobile computing device as the mobile device moves so as to collect a history of travel of the mobile computing device, the history comprising a journey having travel data representing one or more travel events and one or more stop events taken by the mobile computing device;
transmitting the travel data to a central server;
analyzing the travel data by the central server by:
segmenting the data into travel segments representing stops based on the stop events and movement of the mobile computing device based on the travel events;
filtering one or more false-stops from the stop events;
determining data features from the travel events for identifying a type of travel of one or more of the travel segments;
classifying one or more of the data segments as one or more of a stop and a mode of travel; and
providing a web interface including features to verify the modes of travel and stops of the user.

20. The method of claim 19 wherein analyzing the data further comprises merging data segments to eliminate one or more of false stops and false trips.

21. The method of claim 19 wherein analyzing the data further comprises classifying the mode of travel data segments to determine a type of travel.

22. The method of claim 21 wherein the type of travel includes one or more of: car travel, bus travel, and train travel.

23. The system of claim 1 wherein the networked data processing device is configured to identify the mode of travel by utilizing user-verified contextual data related to the mode of travel.

24. The method of claim 13 wherein the central server is configured to analyze the one or more travel events by utilizing user-verified contextual data related to the travel events.

25. The method of claim 19 wherein classifying the one or more data segments includes utilizing stored, user-verified contextual data related to the data segments.

* * * * *

UNITED STATES PATENT AND TRADEMARK OFFICE
CERTIFICATE OF CORRECTION

PATENT NO.         : 10,024,978 B2
APPLICATION NO.    : 14/594611
DATED              : July 17, 2018
INVENTOR(S)        : Moshe E. Ben-Akiva et al.

It is certified that error appears in the above-identified patent and that said Letters Patent is hereby corrected as shown below:

In the Specification

Column 1, Line 22, replace "herein after" with --hereinafter--

Column 3, Lines 61-62, remove "includes mobile device 102"

Column 9, Line 39, replace "service" with --services--

Column 9, Line 54, replace "1404" with --1406--

Signed and Sealed this
Sixteenth Day of October, 2018

Andrei Iancu
*Director of the United States Patent and Trademark Office*